United States Patent
Senthil et al.

(10) Patent No.: US 12,353,493 B2
(45) Date of Patent: Jul. 8, 2025

(54) SYSTEM AND METHOD TO INJECT NAVIGATION ELEMENTS WITH STATIC CONTENT OF A WEBSITE FOR ELECTRONIC-COMMERCE

(71) Applicant: firmly Inc, Sammamish, WA (US)

(72) Inventors: Kumar N Senthil, Sammamish, WA (US); Muralidharan Krishnamurthy, Bellevue, WA (US); Romeu Palos de Gouvea, New Castle, WA (US)

(73) Assignee: firmly Inc, Sammamish, WA (US)

( * ) Notice: Subject to any disclaimer, the term of this patent is extended or adjusted under 35 U.S.C. 154(b) by 68 days.

(21) Appl. No.: 18/310,561

(22) Filed: May 2, 2023

(65) Prior Publication Data
US 2024/0370512 A1    Nov. 7, 2024

(51) Int. Cl.
*G06F 3/048* (2013.01)
*G06F 3/0482* (2013.01)
*G06F 16/954* (2019.01)
*G06F 16/958* (2019.01)

(52) U.S. Cl.
CPC .......... *G06F 16/954* (2019.01); *G06F 3/0482* (2013.01); *G06F 16/958* (2019.01)

(58) Field of Classification Search
CPC ..... G06F 40/134; G06F 16/958; G06F 16/954
See application file for complete search history.

(56) References Cited

U.S. PATENT DOCUMENTS

| | | | |
|---|---|---|---|
| 8,626,491 B2 | 1/2014 | Gattani et al. | |
| 10,235,681 B2* | 3/2019 | Chang | G06F 40/237 |
| 10,496,683 B2 | 12/2019 | Franceschini et al. | |
| 2007/0118803 A1* | 5/2007 | Walker | G06F 16/954 715/239 |
| 2008/0244038 A1* | 10/2008 | Martinez | G06Q 50/00 709/218 |
| 2009/0083815 A1* | 3/2009 | McMaster | H04N 21/8586 725/110 |
| 2010/0138271 A1* | 6/2010 | Henkin | G06Q 30/0256 705/14.54 |
| 2010/0138451 A1* | 6/2010 | Henkin | G06Q 30/02 707/803 |

(Continued)

FOREIGN PATENT DOCUMENTS

CN    113033205 A    6/2021

*Primary Examiner* — David Phantana-angkool
(74) *Attorney, Agent, or Firm* — Jason C. Cameron (57) ABSTRACT

A system to inject navigation elements with static content of a website for electronic commerce is disclosed. The system includes a content sourcing module to source content from the website. The system includes a processing module to process textual information present in the content sourced to obtain processed data. The processing module is configured to tokenize the processed data to extract keywords and to identify entities from the keywords extracted. The system includes a locating module to locate web resources offering sale of the entities identified and to shortlist the web resources. The system includes a hyperlink module to embed a universal resource locator corresponding to the web resources to the entities upon shortlisting. The system includes an overlay module to display an overlay view of the web resources in a user interface when a user interacts with the entities.

20 Claims, 6 Drawing Sheets

(56) References Cited

U.S. PATENT DOCUMENTS

| | | | |
|---|---|---|---|
| 2011/0213655 A1* | 9/2011 | Henkin | G06Q 30/00 707/E17.061 |
| 2015/0106157 A1* | 4/2015 | Chang | G06F 40/237 705/7.29 |
| 2015/0254216 A1* | 9/2015 | DeLuca | G06F 40/134 715/206 |
| 2015/0356101 A1* | 12/2015 | Cohen | G06F 40/20 707/722 |
| 2016/0232569 A1* | 8/2016 | Pankov | G06Q 30/0277 |
| 2019/0138655 A1* | 5/2019 | Deets, Jr. | G06Q 50/01 |
| 2019/0325021 A1 | 10/2019 | Zhang | |
| 2019/0332362 A1* | 10/2019 | Dejanovic | G06F 11/302 |
| 2020/0293160 A1* | 9/2020 | Soyarslan | G06F 3/0482 |
| 2021/0141852 A1* | 5/2021 | Narth | G06F 16/358 |
| 2024/0370512 A1* | 11/2024 | Senthil | G06F 16/958 |

* cited by examiner

SYSTEM AND METHOD TO INJECT NAVIGATION ELEMENTS WITH STATIC CONTENT OF A WEBSITE FOR ELECTRONIC-COMMERCE

FIELD OF INVENTION

Embodiments of the present disclosure relate to the field of digital data processing and more particularly to a system and method to inject one or more navigation elements with static content of a website for supporting electronic commerce.

BACKGROUND

Webpages are documents displayed on the World Wide Web (WWW) and are accessible through a web browser. The webpages are built using content management systems, client-side scripting languages, and server-side scripting languages. The web pages include various elements, such as text, images, videos, audio files, links, and interactive features designed to be viewed on a computer, tablet, or mobile device through the internet. Ad servers enable a person affiliated with the web pages to earn money by displaying advertisements on the web pages. The advertisements are displayed on the web pages upon placing a script provided by the ad servers in the web pages by the person affiliated with the website.

Currently, advertisements are displayed on the web pages irrespective of the content, resulting in less viewer engagement and revenue loss. Apart from that, the task of displaying advertisements on the web pages restricting the placement of the script is challenging. The advertisements which redirect a user to another webpage reduce the focus levels of the user. Further, the advertisements related to e-commerce fail to provide any information regarding the inventory status and the cost of the product, thereby affecting the conversion rate of the advertisements.

Hence, there is a need for a system and method to inject one or more navigation elements with static content of a website for supporting electronic commerce to address the aforementioned issue(s).

OBJECTIVE OF THE INVENTION

Objective of the invention is to identify one or more entities from static content of a website and inject one or more navigation elements with the one or more entities to support electronic commerce.

BRIEF DESCRIPTION

In accordance with an embodiment of the present disclosure, a system to inject one or more navigation elements with static content of a website for supporting electronic commerce is provided. The system includes a processing subsystem hosted on server and configured to execute on a network to control bidirectional communications among a plurality of modules. The processing subsystem includes a content sourcing module operatively coupled to an integrated database. The content sourcing module is configured to source content from the website upon placing a predefined script into a source code of the website. The processing subsystem also includes a processing module operatively coupled to the content sourcing module. The processing module is configured to process textual information present in the content sourced to obtain processed data by removing one or more elements. The one or more elements includes at least one of a tag, and a punctuation mark. The processing module is also configured to tokenize the processed data obtained to extract one or more keywords from the processed data. The processing module is further configured to identify one or more entities from the one or more keywords extracted by a plurality of techniques including at least one of part of speech tagging, dependency parsing, and word embedding. The processing subsystem also includes a locating module operatively coupled to the processing module. The locating module is configured to locate one or more web resources offering sale of the one or more entities identified. The locating module is also configured to shortlist the one or more web resources located based on at least one of a price, customer rating, delivery time, location of a user, and type of a user device. The processing subsystem further includes a hyperlink module operatively coupled to the locating module. The hyperlink module is configured to embed a universal resource locator corresponding to each of the one or more web resources to the one or more corresponding entities upon shortlisting to link each of the one or more entities to the one or more corresponding web resources shortlisted. The processing subsystem further includes an overlay module operatively coupled to the hyperlink module. The overlay module is configured to integrate one or more scripts corresponding to the one or more web resources to the one or more corresponding entities upon embedding to display an overlay view of the one or more web resources in a user interface when a user interact with the one or more corresponding entities via one or more inputs, thereby supporting the electronic commerce.

In accordance with another embodiment of the present disclosure, a method to inject one or more navigation elements with static content of a website for supporting electronic commerce is provided. The method includes sourcing, by a content sourcing module, content from the website upon placing a predefined script into a source code of the website. The method also includes processing, by a processing module, textual information present in the content sourced to obtain processed data by removing one or more elements. The one or more elements includes at least one of a tag, and a punctuation mark. The method further includes tokenizing, by the processing module, the processed data obtained to extract one or more keywords from the processed data. The method also includes identifying, by the processing module, one or more entities from the one or more keywords extracted by a plurality of techniques including at least one of part of speech tagging, dependency parsing, and word embedding. The method further includes locating, by a locating module, one or more web resources offering sale of the one or more entities identified. The method also includes shortlisting, by the locating module, the one or more web resources located based on at least one of a price, customer rating, delivery time, location of a user, and type of a user device. The method further includes embedding, by a hyperlink module, a universal resource locator corresponding to the one or more web resources to the one or more corresponding entities upon shortlisting to link each of the one or more entities to the one or more corresponding web resources shortlisted. The method also includes integrating, by an overlay module, one or more scripts corresponding to each of the one or more web resources to the one or more corresponding entities upon embedding to display an overlay view of the one or more web resources in a user interface when a user interact with the one or more corresponding entities via one or more inputs, thereby assisting the electronic commerce.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to inject one or more navigation elements with static content of a website for supporting electronic commerce. The system includes a processing subsystem hosted on server and configured to execute on a network to control bidirectional communications among a plurality of modules. The processing subsystem includes a content sourcing module operatively coupled to an integrated database. The content sourcing module is configured to source content from the website upon placing a predefined script into a source code of the website. The processing subsystem also includes a processing module operatively coupled to the content sourcing module. The processing module is configured to process textual information present in the content sourced to obtain processed data by removing one or more elements. The one or more elements includes at least one of a tag, and a punctuation mark. The processing module is also configured to tokenize the processed data obtained to extract one or more keywords from the processed data. The processing module is further configured to identify one or more entities from the one or more keywords extracted by a plurality of techniques including at least one of part of speech tagging, dependency parsing, and word embedding. The processing subsystem also includes a locating module operatively coupled to the processing module. The locating module is configured to locate one or more web resources offering sale of the one or more entities identified. The locating module is also configured to shortlist the one or more web resources located based on at least one of a price, customer rating, delivery time, location of a user, and type of a user device. The processing subsystem further includes a hyperlink module operatively coupled to the locating module. The hyperlink module is configured to embed a universal resource locator corresponding to each of the one or more web resources to the one or more corresponding entities upon shortlisting to link each of the one or more entities to the one or more corresponding web resources shortlisted. The processing subsystem further includes an overlay module operatively coupled to the hyperlink module. The overlay module is configured to integrate one or more scripts corresponding to the one or more web resources to the one or more corresponding entities upon embedding to display an overlay view of the one or more web resources in a user interface when a user interact with the one or more corresponding entities via one or more inputs, thereby supporting the electronic commerce.

Figure 1:
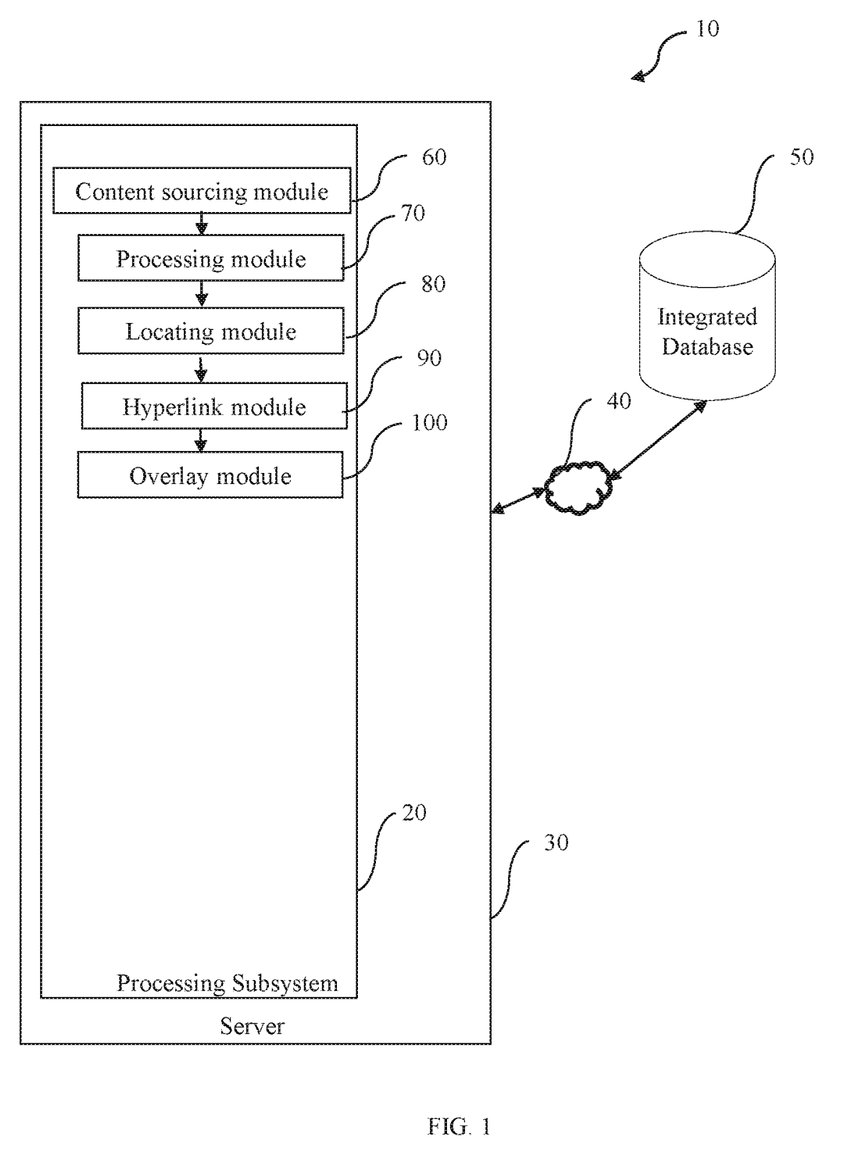
FIG. 1 is a block diagram representation of a system to inject one or more navigation elements with static content of a website for supporting electronic commerce in accordance with an embodiment of the present disclosure.

FIG. 1 is a block diagram representation of a system 10 to inject one or more navigation elements with static content of a website for supporting electronic commerce in accordance with an embodiment of the present disclosure. The system 10 includes a processing subsystem 20. The processing subsystem 20 is hosted on a server 30. In one embodiment, the server 30 may be a cloud-based server. In another embodiment, the server 30 may be a local server. The processing subsystem 20 is configured to execute on a network 40 to control bidirectional communications among a plurality of modules. In one example, the network 40 may be a private or public local area network (LAN) or wide area network, such as the internet.

Moreover, in another embodiment, the network 40 may include both wired and wireless communications according to one or more standards and/or via one or more transport mediums. In yet another embodiment, the network 40 may also include communications over a terrestrial cellular network, including, a GSM (global system for mobile communications), CDMA (code division multiple access), and/or EDGE (enhanced data for global evolution) network.

Further, the processing subsystem 20 includes a content sourcing module 60 operatively coupled to an integrated database 50. In one embodiment, the integrated database 50 may include, but not limited to, an SQL database, a non-SQL database, a hierarchical database, a columnar database and the like. The content sourcing module 60 is configured to source content from the website upon placing a predefined script into a source code of the website. In one embodiment, the content sourcing module 60 may be able to source the content from the website by a web scraping technique. In such an embodiment, the web scraping technique may include, but not limited to, hypertext markup protocol (HTML) parsing, automated browser, application programming interface (API) parsing, web crawling and the like. For example, consider a scenario in which person X is a blogger managing a blog Y. The blog Y may be featuring content related to upcoming trends in footwears. The content sourcing module 60 may be able to access content upon placing the predefined script on the blog Y by the person X.

Furthermore, the processing subsystem 20 also includes a processing module 70 operatively coupled to the content sourcing module 60. The processing module 70 is configured to process textual information present in the content sourced to obtain processed data by removing one or more elements. The one or more elements includes at least one of a tag, and a punctuation mark. In one embodiment, the tag may include a hypertext markup protocol tag. The processing module 70 is also configured to tokenize the processed data obtained to extract one or more keywords from the processed data. The processing module 70 is further configured to identify one or more entities from the one or more keywords extracted by a plurality of techniques including at least one of part of speech tagging, dependency parsing, and word embedding.

Additionally, as used herein, the parts of speech tagging may be defined as a process of labelling each word in a sentence with a corresponding parts of speech. In one embodiment, the part of speech tagging may include at least one of technique comprising rule based parts of speech tagging, stochastic parts of speech tagging, transformational parts of speech tagging, deep learning based parts of speech tagging. As used herein, the rule based parts of speech tagging functions are based on one or more predefined rules. As used herein, the stochastic parts of speech tagging employs one or more stochastic models for assigning parts of speech to words in a text. As used herein, the transformational parts of speech tagging utilizes a set of rules to transform a text into a different form, such as a parse tree where the parts of speech are assigned.

Moreover, as used herein, the deep learning based parts of speech tagging utilizes neural networks to learn patterns in a text and automatically assign parts of speech to words. As used herein, the dependency parsing may be defined as a process of analysing grammatical structure of the sentence by identifying relationship between each word of the sentence. As used herein, word embedding may be defined as a process which may be used to represent the sentence in a numerical format to make the sentence compatible with a machine langue. In one embodiment, the one or more entities may include at least one of physical goods, digital goods, services, subscription-based products, bundled products, customized products and virtual products.

Also, in continuation with the ongoing example, consider a scenario in which the content sourced by the content sourcing module 60 from the blog Y may include a sentence as follows: "There was a recent sighting of a person wearing a pair of Nike's air force 1 sneakers". The processing module 70 may remove the full stop from the sentence first to obtain the processed data. Then the processing module 70 may tokenize the processed data to extract the one or more keywords as follows: 'there', 'was', 'a', 'recent', 'sighting', 'of', 'a', 'person', 'wearing', 'a', 'pair', 'of', 'Nike's', 'air force 1', 'sneakers'. The processing module 70 may further identify one or mor entities from the one or more keywords extracted as shown below. The processing module 70 may employ the parts of speech tagging to extract different parts of speech from the sentence as follows: there=existential, was=past tense verb, a=determiner, recent=adjective, sighting=noun, of =preposition, a=determiner, person=noun, wearing=verb, a=determiner, pair=noun, of =preposition, Nike's=proper noun, air force 1=noun, sneakers=noun.

Moreover, once the parts of speech tagging is done, the processing module 70 may perform the dependency parsing to analyze relation between the one or more keywords and the same may be embedded into a specific numerical format to make the one or more keywords compatible with the machine language for the purpose of identifying the one or more entities. Consider a scenario in which the machine learning model may be configured to identify a specific model of corresponding footwear brands. As a result, the one or more entities identified may include 'Airforce 1' which is a specific model of Nike brand.

Further, the processing subsystem 20 includes a locating module 80 operatively coupled to the processing module 70. The locating module 80 is configured to locate one or more web resources offering sale of the one or more entities identified. In one embodiment, the one or more web resources may include at least one of websites, online marketplaces, and social media platforms. The locating module 80 is also configured to shortlist the one or more web resources located based on at least one of a price, customer rating, delivery time, location of a user, and type of a user device. In continuation with the ongoing example, the locating module 80 may locate one or more websites selling the 'Airforce 1'. Consider a scenario in which a website A may be selling the 'Airforce 1' for 90 USD and a website B may be selling the 'Airforce 1' for 100 USD. The locating module 80 may shortlist the website A based on a lower price listing.

Furthermore, the processing subsystem 20 further includes a hyperlink module 90 operatively coupled to the locating module 80. The hyperlink module 90 is configured to embed a universal resource locator corresponding to each of the one or more web resources to the one or more corresponding entities upon shortlisting to link each of the one or more entities to the one or more corresponding web resources shortlisted. In one embodiment, the hyperlink module 90 may be configured to provide a predefined color code to the one or more entities identified to highlight the one or more entities. In one embodiment, the hyperlink module 90 may be configured to fetch price corresponding to the one or more entities from the one or more corresponding web resources. In such an embodiment, the hyperlink module 90 may display the price fetched along with the one or more corresponding entities to notify the user regarding the price of the one or more corresponding entities.

Additionally, in continuation with the ongoing example, the hyperlink module 90 may be configured to embed the universal resource locator corresponding to the website A to the 'Airforce 1' to link the 'Airforce 1' to the website A. The hyper link module may fetch the price of 'Airforce 1' from the website A and may display it along with the 'Airforce 1' to make a person aware about cost of the same. The hyper link module may highlight the 'Airforce 1' with a predefined colour to increase visibility of the 'Airforce 1'.

Moreover, the processing subsystem 20 includes an overlay module 100 operatively coupled to the hyperlink module 90. The overlay module 100 is configured to integrate one or more scripts corresponding to the one or more web resources to the one or more corresponding entities upon embedding to display an overlay view of the one or more web resources in a user interface when a user interact with the one or more corresponding entities via one or more inputs, thereby supporting the electronic commerce. In one embodiment, the one or more inputs may include at least one of a mouse click, a cursor movement, a touch on a graphical user interface and a gaze at the graphical user interface. In continuation with the ongoing example, the overlay module 100 may integrate the one or more scripts corresponding to the website A to the entity 'Airforce 1' to display the overlay view of the website A in the user interface when the user moves cursor over the 'Airforce 1'. The overlay view of the website may assist the user to proceed with the purchase of the entity 'Airforce 1' by displaying consecutive pages such as product page, shopping cart, order summary, and checkout page and the like.

Figure 2:
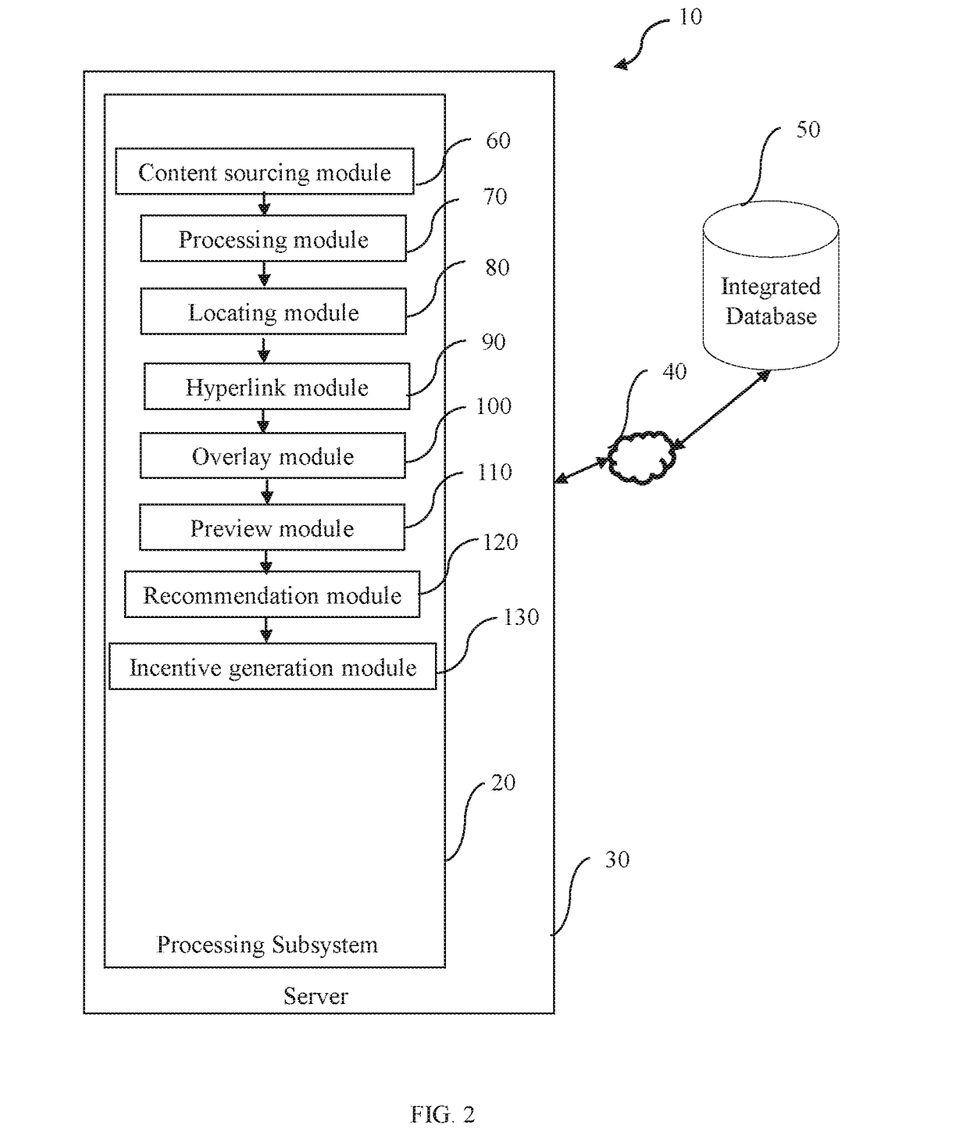
FIG. 2 is a block diagram representation of one embodiment of the system of FIG. 1, in accordance with an embodiment of the present disclosure.

FIG. 2 is a block diagram representation of one embodiment of the system 10 of FIG. 1, in accordance with an embodiment of the present disclosure. The system 10 of FIG. 1 includes the content sourcing module 60, the processing module 70, the locating module 80, the hyperlink module 90, and the overlay module 100. In one embodiment, the system 10 of FIG. 1 may include the processing subsystem 20 including a preview module 110 configured to highlight one or more changes made in the content of the website by the hyperlink module 90 and the overlay module 100 to enable a person affiliated with the website to review the one or more changes. In one embodiment, the person affiliated may include, but not limited to, an owner of the webpage, a content manager, an administrator and the like. In such an embodiment, the preview module 110 may be configured to enable the person affiliated to perform one or more actions comprising at least one of a modification omission in the one or more changes highlighted to obtain a scrutinized content.

Further, in one embodiment, the preview module 110 may be configured to publish the scrutinized content in the website upon performing the one or more actions by the person affiliated. In continuation with the ongoing example, the preview module 110 may be configured to highlight addition of the universal resource locator of the website A to the 'Airforce 1' and the overlay view of the website A getting displayed when the user interacts with the 'Airforce 1'. The preview module 110 may enable the user X to change the way in which the overlay is displayed, or the way in which the universal resource locator is color coded to obtain the scrutinized content. The preview module 110 may modify the content of the website by publishing the scrutinized content.

Furthermore, in one embodiment, the processing subsystem 20 may include a recommendation module 120 configured to analyze the content of a webpage in real time to identify the one or more entities. In such an embodiment, the recommendation module 120 may recommend addition of the universal resource locator corresponding to the one or more web resources to the one or more entities identified to enable the one or more entities to function as a pointer towards the one or more corresponding web resources. In one embodiment, the recommendation module 120 may modify the content of the webpage upon accepting the addition recommended by the person affiliated to the webpage. In one embodiment, the recommendation module 120 may be configured to source the content of the webpage in real-time for analysis through a predefined plugin integrated on a browser. As used herein, the plugin may be defined as a piece of software code which may be added to an existing software application to provide additional functionality. In one embodiment, the browsers may include, but not limited to, Google Chrome, Mozilla Firefox, Apple Safari, Microsoft Edge, Opera, Brave, Vivaldi, Tor Browse, Uc Browser, Yandex Browser and the like.

Moreover, in continuation with the ongoing example, consider a scenario in which the user X may be modifying the content of the blog Y by adding information regarding adidas's 'Adi zero adios boost 2' shoe type. The recommendation module 120 may analyze the content added by the user X and may identify the one or more entities such as 'Adi zero adios boost 2'. The recommendation module 120 may further identify the one or more web resources offering sale of the 'Adi zero adios boost 2' and recommend addition of the universal resource locator corresponding to the one or more such web resources to the 'Adi zero adios boost 2'. The recommendation moule may modify the content of the blog Y upon accepting the addition recommended by the person X.

Moreover, consider another scenario in which, the user X may be interacting with a chat bot through a web browser linked with the recommendation module 120. The recommendation module 120 may analyze one or more responses generated by the chat bot on a webpage corresponding to one or more queries made by the user X. The recommendation module 120 may further identify the one or more entities from the one or more responses and may add the universal resource locator corresponding to the one or more web resources to the one or more entities identified to enable the user X to navigate to the one or more web resources from the page of the chat bot itself.

Additionally, in one embodiment, the processing subsystem 20 may include an incentive generation module 130 configured to encode an associated identifier with the universal resource locator embedded to the one or more entities to track engagement of the user with the one or more entities. In such an embodiment, the incentive generation module 130 may be configured to incentivize the person affiliated to the website with a predefined amount disbursed by one or more advertisers associated with the one or more corresponding web resources based on the one or more metrices provided. In one embodiment, the one or more metrices may include, but not limited to, number of clicks, number of views, conversion rate, duration of engagement and the like.

Also, in continuation with the ongoing example, the incentive generation module 130 may be configured to encode an associated identifier to the universal resource locator embedded to the one or more entities identified on the blog Y. The associated identifier may be unique to the user X and may be capable of tracking engagement of persons visiting the blog Y with the one or more entities. The incentive generation module 130 may facilitate the transfer of the predefined amount disbursed by the one or more advertisers associated with the universal resource locator to the user X. The predefined amount disbursed by the one or more advertisers may be based on the one or more metrices.

Figure 3:
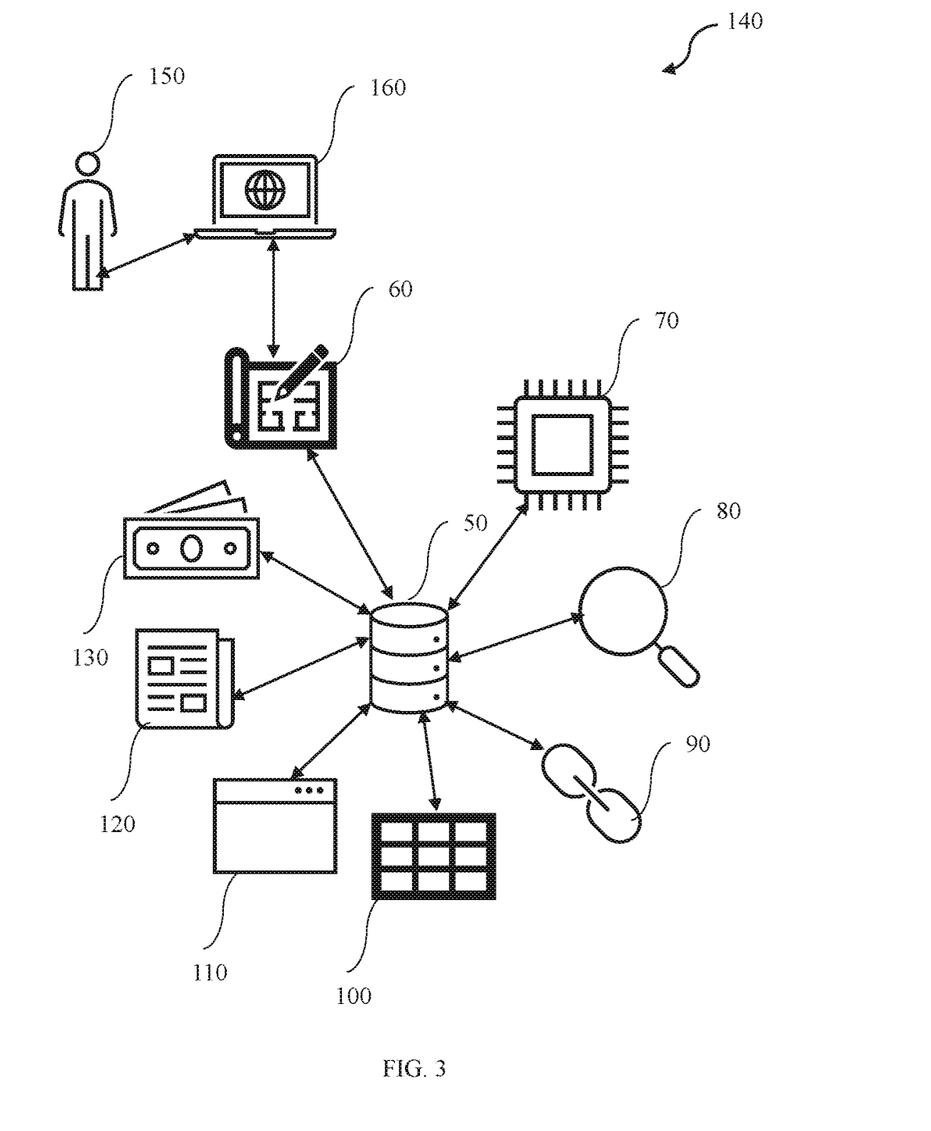
FIG. 3 is a schematic representation of an exemplary embodiment of the system of FIG. 1, in accordance with an embodiment of the present disclosure.

FIG. 3 is a schematic representation of an exemplary embodiment 140 of the interactive system 10 of FIG. 1 in accordance with an embodiment of the present disclosure. Consider a scenario in which user C 150 is a content creator managing a web site D 160 featuring various gadgets. The content sourcing module 60 may source the content of the website D upon placing the predefined script on the website D 160 by the user C 150. The processing module 70 may further process textual information present in the content sourced by removing tags and punctuation marks from the content to obtain the processed data. For the simplicity of description a sentence fragment of the processed data may be used. The sentence fragment may look like "you can snag this highly rated google nest mini . . . ". The processing module 70 may further tokenize the sentence fragment to extract one or more keywords such as you, can, snag, this, highly, rated google, nest, mini.

Further, the processing module 70 may identify the one or more entities of interest through a plurality of techniques. The one or more identities may include proper nouns present in the sentence fragment such as 'google nest mini'. The locating module 80 may further locate the one or more web resources offering sale of the one or more entities identified as 'google nest mini' in accordance with the current example. The locating module 80 may locate a website E, a website F, and a website G offering the sale of the 'google nest mini' and may shortlist the website E based on the cost, availability and customer ratings. The hyper link module may embed the universal resource locator corresponding to the website E to the 'google nest mini' upon shortlisting and may also provide the color coding to the universal resource locator to increase the visibility of the same.

Furthermore, the hyper link module may also display the cost of the 'google nest mini' fetched from the website E alongside of the one or more entities identified as the 'google nest mini'. The overlay module 100 may be configured to integrate the one or more scripts associated with the website E into the one or more entities identified as the 'google nest mini' to display the overlay of the website E when the user moves cursor over the 'google nest mini'. The review module may enable the user C 150 to review the changes made by the hyperlink module 90 and the overlay module 100 and modify the same if required before publishing the content with modifications in the website D 160. The incentive generation module 130 may encode the associated identifier into the universal resource located embedded by the hyperlink module 90 to track engagement of one or more visitors visiting the website F and interactions of the one or more visitors with the one or more entities identified.

Additionally, the incentive generation module 130 may transfer the predefined fund disbursed by the one or more advertisers associated with the universal resource locator to the user C 150. The predefined amount disbursed may be based on the one or more metrices provided to the one or more advertisers by the incentive generation module 130.

The one or more metrices may include, the conversion rate, the view duration and the like. Similarly, the recommendation module 120 may be configured to analyze the content of the webpage associated with the website. The recommendation module 120 may recommend addition of the universal resource locator corresponding to the one or more web resources to the one or more entities identified. The recommend may modify the content of the website upon accepting the addition recommended by the user C 150.

Figure 4:
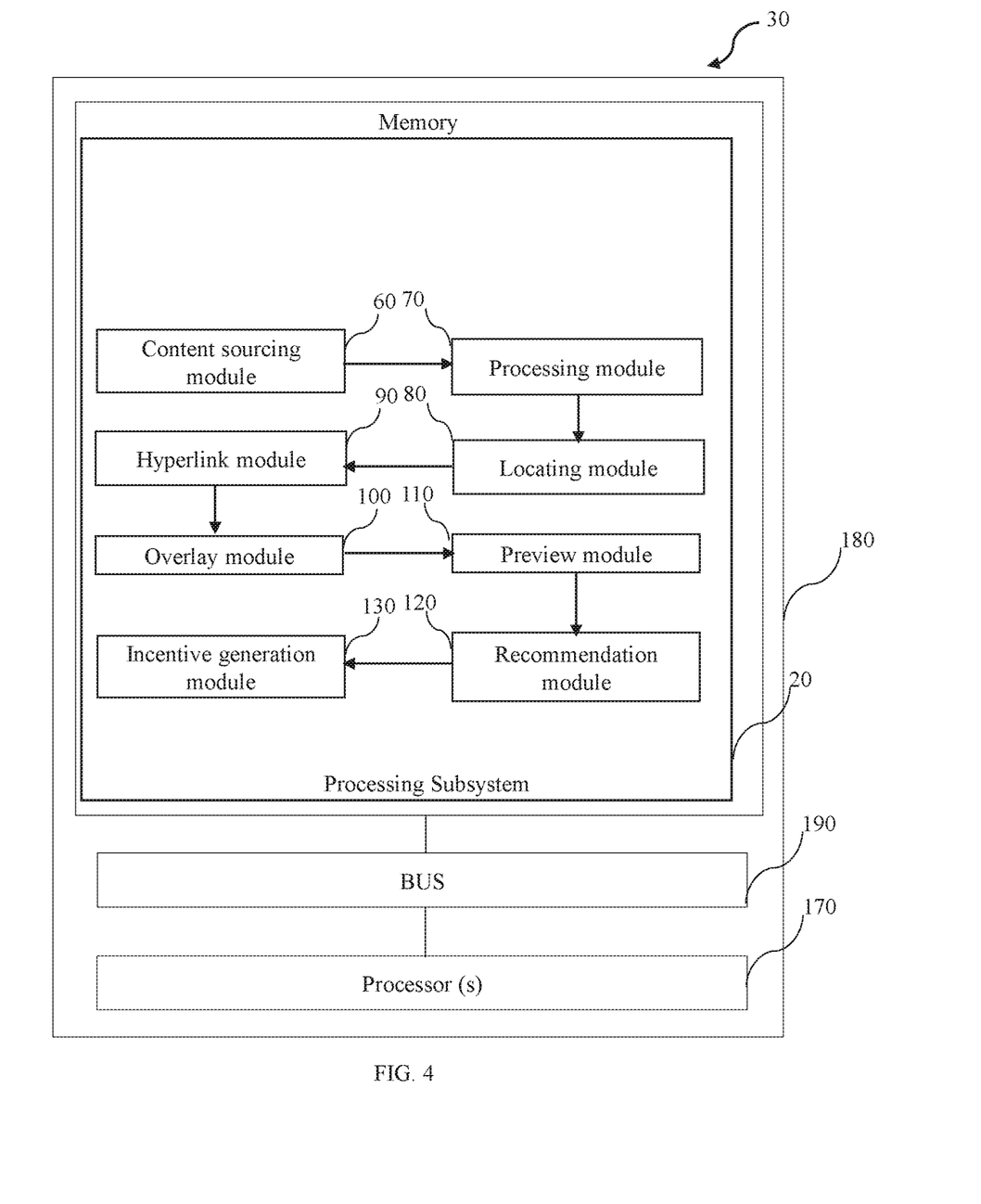
FIG. 4 is a block diagram of a computer or a server in accordance with an embodiment of the present disclosure.

FIG. 4 is a block diagram of a computer or a server 30 in accordance with an embodiment of the present disclosure. The server 30 includes processor(s) 170, and memory 180 operatively coupled to the bus 190. The processor(s) 170, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 180 includes several subsystems stored in the form of executable program which instructs the processor to perform the method steps illustrated in FIG. 1. The memory 180 is substantially similar to the system 10 of FIG. 1. The memory 180 has the following subsystems: the processing subsystem 20 including the content sourcing module 60, the processing module 70, the locating learning module, the hyperlink module 90, the overlay module 100, the recommendation module 120, the incentive generation module 130 and the preview module 110. The plurality of modules of the processing subsystem 20 performs the functions as stated in FIG. 1 and FIG. 2. The bus 190 used herein refers to the internal memory channels or computer network that is used to connect computer components and transfer data between them. The bus 190 includes a serial bus or a parallel bus, wherein the serial bus transmit data in bit-serial format and the parallel bus transmit data across multiple wires. The bus 190 used herein may include but not limited to, a system bus, an internal bus, an external bus, an expansion bus, a frontside bus, a backside bus, and the like.

The processing subsystem 20 includes a content sourcing module 60 operatively coupled to an integrated database 50. The content sourcing module 60 is configured to source content from the website upon placing a predefined script into a source code of the website. The processing subsystem 20 also includes a processing module 70 operatively coupled to the content sourcing module 60. The processing module 70 is configured to process textual information present in the content sourced to obtain processed data by removing one or more elements. The one or more elements includes at least one of a tag, and a punctuation mark. The processing module 70 is also configured to tokenize the processed data obtained to extract one or more keywords from the processed data. The processing module 70 is further configured to identify one or more entities from the one or more keywords extracted by a plurality of techniques including at least one of part of speech tagging, dependency parsing, and word embedding. The processing subsystem 20 also includes a locating module 80 operatively coupled to the processing module 70. The locating module 80 is configured to locate one or more web resources offering sale of the one or more entities identified. The locating module 80 is also configured to shortlist the one or more web resources located based on at least one of a price, customer rating, delivery time, location of a user, and type of a user device. The processing subsystem 20 further includes a hyperlink module 90 operatively coupled to the locating module 80. The hyperlink module 90 is configured to embed a universal resource locator corresponding to each of the one or more web resources to the one or more corresponding entities upon shortlisting to link each of the one or more entities to the one or more corresponding web resources shortlisted. The hyperlink module 90 is also configured to fetch prices corresponding to the one or more entities from the one or more corresponding web resources. The hyperlink module 90 is further configured to display the price fetched along with the one or more corresponding entities to notify the user regarding the price of the one or more corresponding entities.

The processing subsystem 20 further includes an overlay module 100 operatively coupled to the hyperlink module 90. The overlay module 100 is configured to integrate one or more scripts corresponding to the one or more web resources to the one or more corresponding entities upon embedding to display an overlay view of the one or more web resources in a user interface when a user interact with the one or more corresponding entities via one or more inputs, thereby supporting the electronic commerce.

The processing subsystem 20 also includes the recommendation module 120 configured to analyze the content of a webpage in real-time to identify the one or more entities. The recommendation module 120 is also configured to recommend addition of the universal resource locator corresponding to the one or more web resources to the one or more entities identified to enable the one or more entities to function as a pointer towards the one or more corresponding web resources. The recommendation module 120 is further configured to modify the content of the webpage upon accepting the addition recommended by a person affiliated to the webpage.

The processing subsystem 20 also includes the incentive generation module 130 configured to encode an associated identifier with the universal resource locator embedded to the one or more entities to track engagement of the user with the one or more entities. The incentive generation module 130 is also configured to incentivize the person affiliated with the website with a predefined amount disbursed by the one or more advertisers associated with the one or more corresponding web resources based on the one or more metrices provided.

The processing subsystem 20 further includes a preview module 110 configured to highlight one or more changes made in the content of the website by the hyperlink module 90 and the overlay module 100 to enable a person affiliated with the website to review the one or more changes. The preview module 110 is also configured to enable the person affiliated to perform one or more actions comprising at least one of a modification omission in the one or more changes highlighted to obtain a scrutinized content. The preview module 110 is further configured to publish the scrutinized content on the website upon performing the one or more actions by the person affiliated.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 170.

Figure 5A:
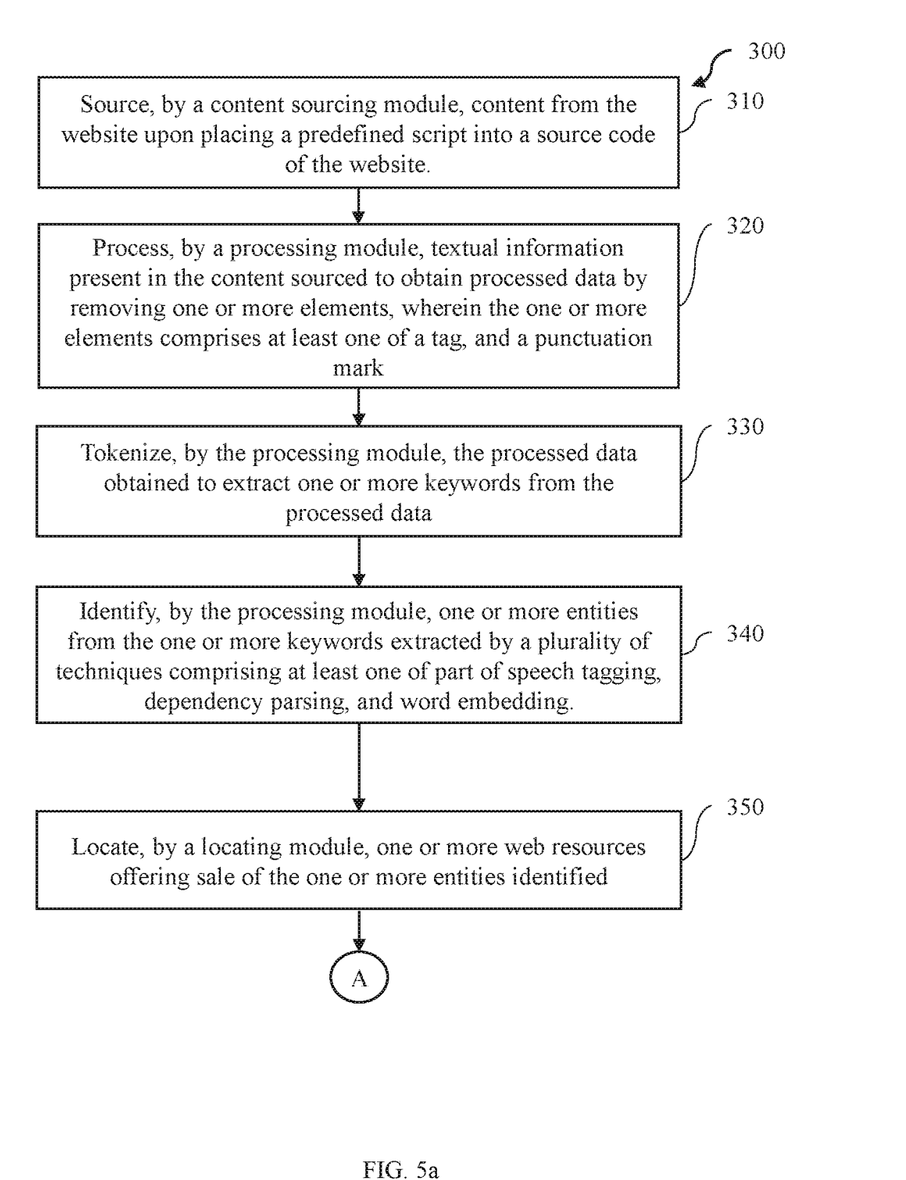
FIG. 5a is a flow chart representing the steps involved in a method to inject one or more navigation elements with static content of a website for supporting electronic commerce in accordance with an embodiment of the present disclosure.
Figure 5B:
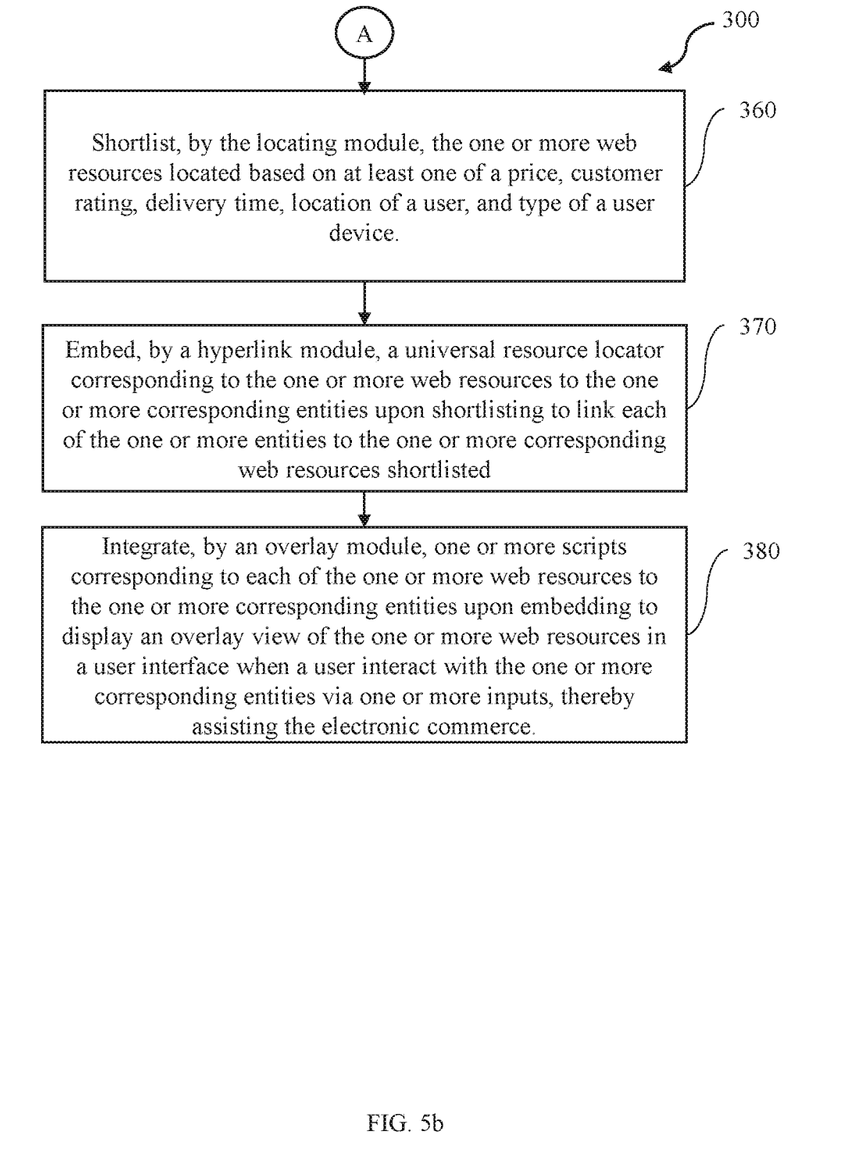
FIG. 5b is a flow chart representing the continued steps involved in a method of FIG. 5a, in accordance with an embodiment of the present disclosure.

FIG. 5a and FIG. 5b is a flow chart representing the steps involved in a method 300 to inject one or more navigation elements with static content of a website for electronic commerce in accordance with an embodiment of the present disclosure. The method 300 includes sourcing content from the website upon placing a predefined script into a source code of the website in step 310. In one embodiment, sourcing content from the website upon placing a predefined script into a source code of the website includes sourcing content from the website upon placing a predefined script into a source code of the website by a content sourcing module. In one embodiment, the content sourcing module may be able to source the content from the website by a web scraping technique. In such an embodiment, the web scraping technique may include, but not limited to, hypertext markup protocol (HTML) parsing, automated browser, application programming interface (API) parsing, web crawling and the like.

The method 300 also includes processing textual information present in the content sourced to obtain processed data by removing one or more element in step 320. In one embodiment, processing textual information present in the content sourced to obtain processed data by removing one or more elements includes processing textual information present in the content sourced to obtain processed data by removing one or more elements by a processing module. In one embodiment, the tag may include a hypertext markup protocol tag.

The method 300 further includes tokenizing the processed data obtained to extract one or more keywords from the processed data in step 330. In one embodiment, tokenizing the processed data obtained to extract one or more keywords from the processed data includes tokenizing the processed data obtained to extract one or more keywords from the processed data by the processing module.

The method 300 also includes identifying one or more entities from the one or more keywords extracted by a plurality of techniques comprising at least one of part of speech tagging, dependency parsing, and word embedding in step 340. In one embodiment, identifying one or more entities from the one or more keywords extracted by a plurality of techniques comprising at least one of part of speech tagging, dependency parsing, and word embedding includes identifying one or more entities from the one or more keywords extracted by a plurality of techniques comprising at least one of part of speech tagging, dependency parsing, and word embedding by the processing module. In one embodiment, the one or more entities may include at least one of physical goods, digital goods, services, subscription-based products, bundled products, customized products and virtual products.

The method 300 also includes locating one or more web resources offering sale of the one or more entities identified in step 350. In one embodiment, locating one or more web resources offering sale of the one or more entities identified includes locating one or more web resources offering sale of the one or more entities identified by a locating module.

The method 300 also includes shortlisting the one or more web resources located based on at least one of a price, customer rating, delivery time, location of a user, and type of a user device in step 360. In one embodiment, shortlisting the one or more web resources located based on at least one of a price, customer rating, delivery time, location of a user, and type of a user device includes shortlisting the one or more web resources located based on at least one of a price, customer rating, delivery time, location of a user, and type of a user device by the locating module. In one embodiment, the one or more web resources may include at least one of websites, online marketplaces, and social media platforms.

The method 300 also includes embedding a universal resource locator corresponding to the one or more web resources to the one or more corresponding entities upon shortlisting to link each of the one or more entities to the one or more corresponding web resources shortlisted in step 370. In one embodiment, embedding a universal resource locator corresponding to the one or more web resources to the one or more corresponding entities upon shortlisting to link each of the one or more entities to the one or more corresponding web resources shortlisted includes embedding a universal resource locator corresponding to the one or more web resources to the one or more corresponding entities upon shortlisting to link each of the one or more entities to the one or more corresponding web resources shortlisted by a hyperlink module.

The method 300 further includes integrating one or more scripts corresponding to each of the one or more web resources to the one or more corresponding entities upon embedding to display an overlay view of the one or more web resources in a user interface when a user interact with the one or more corresponding entities via one or more inputs, thereby assisting the electronic commerce in step 380. In one embodiment, integrating one or more scripts corresponding to each of the one or more web resources to the one or more corresponding entities upon embedding to display an overlay view of the one or more web resources in a user interface when a user interact with the one or more corresponding entities via one or more inputs includes integrating one or more scripts corresponding to each of the one or more web resources to the one or more corresponding entities upon embedding to display an overlay view of the one or more web resources in a user interface when a user interact with the one or more corresponding entities via one or more inputs by an overlay module. In one embodiment, the hyperlink module may be configured to provide a predefined color code to the one or more entities identified to highlight the one or more entities. In one embodiment, the hyperlink module may be configured to fetch price corresponding to the one or more entities from the one or more corresponding web resources. In such an embodiment, the hyperlink module may display the price fetched along with the one or more corresponding entities to notify the user regarding the price of the one or more corresponding entities.

Various embodiments of the system and method to inject one or more navigation elements with static content of the website for supporting electronic commerce described above enable various advantages. The system is capable of converting the static content present in the website into the dynamic content by embedding the universal resource locators corresponding to the one or more web resources that are relevant to one or more entities identified from the static content. The hyperlink module is capable of providing the predefined color code to the one or more entities identified to increase user engagement by highlighting the one or more entities. The hyper link module is also capable of displaying prices of the one or more entities, thereby enabling the user to take informed decisions regarding purchase of the one or more entities.

Further, the overlay module enables the user to perform the purchase of the one or more entities without navigating to any other webpages, thereby retaining the focus level of the user with respect to the content present in the website. The system is capable of interlinking the one or more entities identified with relevant information by embedding the universal resource locator corresponding to the one or more web resources, thereby increasing user engagement. The incentive generation module is capable of incentivizing the person affiliated with the website by providing the one or more metrices to the one or more advertisers.

Also, the recommendation module is capable of providing recommendations regarding the addition of the universal resource locators to the one or more entities identified, thereby assisting the person affiliated with the modification of the website. The preview module is capable of highlighting the changes made by the hyperlink module and the overlay module, to enable the person affiliate to review the changes before publishing the modified content into the website.

Further, from a technical effect point of view, the implementation time required to perform the method steps included in the present disclosure by the one or more processors of the system is very minimal, thereby the system maintains very minimal operational latency and requires very minimal processing requirements.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

We claim:

1. A computer-implemented system to inject navigation elements with static content of a website for supporting electronic commerce comprising:
 a hardware processor; and
 a memory coupled to the hardware processor, wherein the memory comprises a set of program instructions in the form of a processing subsystem, configured to be executed by the hardware processor, wherein the processing subsystem is hosted on server and configured to execute on a network to control bidirectional communications among a plurality of modules comprising:
  a content sourcing module operatively coupled to an integrated database, wherein the content sourcing module is configured to source content from the website upon placing a predefined script into a source code of the website;
  a processing module operatively coupled to the content sourcing module, wherein the processing module is configured to:
   process textual information present in the content sourced to obtain processed data by removing one or more elements, wherein the one or more elements comprises at least one of a tag, and a punctuation mark;
tokenize the processed data obtained to extract one or more keywords from the processed data; and
identify one or more entities from the one or more keywords extracted by a plurality of techniques comprising at least one of part of speech tagging, dependency parsing, and word embedding;
a locating module operatively coupled to the processing module, wherein the locating module is configured to:
locate one or more web resources offering sale of the one or more entities identified; and
shortlist the one or more web resources located based on at least one of a price, customer rating, delivery time, location of a user, and type of a user device;
a hyperlink module operatively coupled to the locating module, wherein the hyperlink module is configured to embed a universal resource locator corresponding to each of the one or more web resources to the one or more corresponding entities upon shortlisting to link each of the one or more entities to the one or more corresponding web resources shortlisted; and
an overlay module operatively coupled to the hyperlink module, wherein the overlay module is configured to integrate one or more scripts corresponding to the one or more web resources to the one or more corresponding entities upon embedding to display an overlay view of the one or more web resources in a user interface when a user interact with the one or more corresponding entities via one or more inputs, thereby supporting the electronic commerce, wherein the overlay module enables the user to perform a purchase of the one or more entities without navigating to the one or more web resources.

2. The system of claim 1, wherein the one or more entities comprises at least one of physical goods, digital goods, services, subscription-based products, bundled products, customized products and virtual products.

3. The system of claim 1, wherein the one or more web resources comprises at least one of websites, online marketplaces, and social media platforms.

4. The system of claim 1, wherein the hyperlink module is configured to provide a predefined color code to the one or more entities identified to highlight the one or more entities.

5. The system of claim 1, wherein the one or more inputs comprises at least one of a mouse click, a cursor movement, and a gaze.

6. The system of claim 1, wherein the hyperlink module is configured to:
fetch price corresponding to the one or more entities from the one or more corresponding web resources; and
display the price fetched along with the one or more corresponding entities to notify the user regarding the price of the one or more corresponding entities.

7. The system of claim 1, wherein processing subsystem comprises a recommendation module configured to:
analyze the content of a webpage in real-time to identify the one or more entities;
recommend addition of the universal resource locator corresponding to the one or more web resources to the one or more entities identified to enable the one or more entities to function as a pointer towards the one or more corresponding web resources; and
modify the content of the webpage upon accepting the addition recommended by a person affiliated to the webpage.

8. The system of claim 7, wherein the recommendation module is configured to source the content of the webpage in real-time for analysis through a predefined plugin integrated on a browser.

9. The system of claim 1, wherein the processing sub system comprises an incentive generation module configured to:
encode an associated identifier with the universal resource locator embedded to the one or more entities to track engagement of the user with the one or more entities; and
provide an incentive to a person affiliated to the website with a predefined amount disbursed by one or more advertisers associated with the one or more corresponding web resources based on one or more metrices provided.

10. The system of claim 9, wherein the one or more metrices comprises at least one of number of clicks, number of views, conversion rate, and duration of viewing.

11. The system of claim 1, wherein the processing subsystem comprises a preview module configured to:
highlight one or more changes made in the content of the website by the hyperlink module and the overlay module to enable a person affiliated with the website to review the one or more changes;
enable the person affiliated to perform one or more actions comprising at least one of a modification omission in the one or more changes highlighted to obtain a scrutinized content; and
publish the scrutinized content on the website upon performing the one or more actions by the person affiliated.

12. The system of claim 1, wherein the server comprises a cloud bases server.

13. The system of claim 1, wherein the server comprises a local server.

14. The system of claim 1, wherein the network comprises a wide area network.

15. The system of claim 1, wherein the network comprises a local area network.

16. The system of claim 1, wherein the integrated database comprises a structured query language database.

17. The system of claim 1, wherein the integrated database comprises a hierarchical database.

18. The system of claim 1, wherein the integrated database comprises a columnar database.

19. The system of claim 1, wherein the part of speech tagging comprises at least one of technique comprising rule based parts of speech tagging, stochastic parts of speech tagging, transformational parts of speech tagging, deep learning based parts of speech tagging.

20. A method performed by a computer-implemented system comprising a hardware processor and a memory storing programming instructions for execution by the hardware processor, wherein the programming instructions, when executed, cause the hardware processor to perform steps comprising:
sourcing, by the hardware processor, content from the website upon placing a predefined script into a source code of the website;
processing, by the hardware processor, textual information present in the content sourced to obtain processed data by removing one or more elements, wherein the one or more elements comprises at least one of a tag, and a punctuation mark;

tokenizing, by the hardware processor, the processed data obtained to extract one or more keywords from the processed data;

identifying, by the hardware processor, one or more entities from the one or more keywords extracted by a plurality of techniques comprising at least one of part of speech tagging, dependency parsing, and word embedding;

locating, by the hardware processor, one or more web resources offering sale of the one or more entities identified;

shortlisting, by the hardware processor, the one or more web resources located based on at least one of a price, customer rating, delivery time, location of a user, and type of a user device;

embedding, by the hardware processor, a universal resource locator corresponding to the one or more web resources to the one or more corresponding entities upon shortlisting to link each of the one or more entities to the one or more corresponding web resources shortlisted; and integrating, by the hardware processor, one or more scripts corresponding to each of the one or more web resources to the one or more corresponding entities upon embedding to display an overlay view of the one or more web resources in a user interface when a user interact with the one or more corresponding entities via one or more inputs, thereby assisting the electronic commerce, wherein the user is enabled for performing a purchase of the one or more entities without navigating to the one or more web resources.

* * * * *